(12) United States Patent
Ramaswamy

(10) Patent No.: US 8,782,723 B2
(45) Date of Patent: Jul. 15, 2014

(54) METHOD AND APPARATUS FOR POWER SAVINGS IN STAGGERCASTING

(75) Inventor: Kumar Ramaswamy, Princeton, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 218 days.

(21) Appl. No.: 12/736,631

(22) PCT Filed: May 2, 2008

(86) PCT No.: PCT/US2008/005773
§ 371 (c)(1),
(2), (4) Date: Oct. 25, 2010

(87) PCT Pub. No.: WO2009/134230
PCT Pub. Date: Nov. 5, 2009

(65) Prior Publication Data
US 2011/0041156 A1   Feb. 17, 2011

(51) Int. Cl.
*H04N 7/173* (2011.01)
*H04N 21/443* (2011.01)
*H04N 21/4402* (2011.01)
*H04N 21/442* (2011.01)
*H04N 5/63* (2006.01)
*H04N 21/262* (2011.01)
*H04N 21/434* (2011.01)

(52) U.S. Cl.
CPC .......... *H04N 21/434* (2013.01); *H04N 21/443* (2013.01); *H04N 21/440263* (2013.01); *H04N 21/4436* (2013.01); *H04N 21/44209* (2013.01); *H04N 5/63* (2013.01); *H04N 21/26275* (2013.01)

USPC .................. 725/93; 725/86; 725/87; 725/88; 725/89; 725/90; 725/91; 725/92

(58) Field of Classification Search
USPC ....................................... 725/86–93
See application file for complete search history.

(56) References Cited

U.S. PATENT DOCUMENTS 6,900,828 B2   5/2005  Ramaswamy et al.
7,085,330 B1   8/2006  Shirali
(Continued)

FOREIGN PATENT DOCUMENTS

CN    1806441       7/2006
CN    1925042 A    3/2007
(Continued)

OTHER PUBLICATIONS

Lee et al., "Adaptive Spatial Resolution Control Scheme for Mobile Video Applications", 2007 IEEE International Symposium on Signal Processing and Information Technology, Dec. 15, 2007, pp. 977-982.

(Continued)

*Primary Examiner* — Pankaj Kumar
*Assistant Examiner* — Charles N Hicks
(74) *Attorney, Agent, or Firm* — Robert D. Shedd; Kuniyuki Akiyama

(57) ABSTRACT

A method and apparatus for saving power in a receiver includes a power savings mode selector for enabling a user input power savings mode or an automatic power savings mode based on detected battery life. When in power savings mode, a lower resolution time-advanced stream is selected and processed. The normal stream (generally at a higher resolution) is not decoded thereby requiring less power at the receiver decoder.

7 Claims, 3 Drawing Sheets

(56) References Cited

U.S. PATENT DOCUMENTS

| | | | |
|---|---|---|---|
| 7,142,204 B2* | 11/2006 | Shiotsu et al. | 345/211 |
| 8,065,594 B2* | 11/2011 | Limberg | 714/786 |
| 2003/0142087 A1 | 7/2003 | Shiotsu et al. | |
| 2004/0158878 A1 | 8/2004 | Ratnakar et al. | |
| 2004/0232985 A1 | 11/2004 | Itahara | |
| 2005/0024543 A1 | 2/2005 | Ramaswamy et al. | |
| 2006/0050781 A1 | 3/2006 | Cooper et al. | |
| 2006/0056505 A1 | 3/2006 | Ramaswamy et al. | |
| 2007/0047925 A1 | 3/2007 | Araki | |
| 2007/0297754 A1 | 12/2007 | Wada | |
| 2010/0205639 A1* | 8/2010 | Vavelidis et al. | 725/62 |

FOREIGN PATENT DOCUMENTS

| | | |
|---|---|---|
| JP | 2006-517078 | 7/2006 |
| JP | 2006-527975 | 12/2006 |
| JP | 2007-312127 | 11/2007 |
| WO | WO03009578 | 1/2003 |
| WO | 2004/114668 A1 | 12/2004 |
| WO | WO2004114667 | 12/2004 |
| WO | WO2004114668 | 12/2004 |
| WO | WO2005050637 | 6/2005 |
| WO | WO2005094067 | 10/2005 |

OTHER PUBLICATIONS

Benini et al.: "Designing Low-Power Circuits: Practical Recipes", IEEE Circuits and Systems Magazine, IEEE Service Center, Jan. 1, 2001, pp. 6-25.

Video Standards and Drafts, "Applications and Requirements for Scalable Video Coding", International Organisation for Standardisation, ISO/IEC JTC1/SC29/WG11, N6830, Coding of Moving Pictures and Audio, Palma de Mallorca, Spain, Oct. 2004.

Internatioinal Search Report Nov. 13, 2008.

Vitali, Andrea L., et al., "Video over IP using standart-compatible multiple description coding: an IETF proposal", Journal of Zhejiang University Science A; An International applied physics & engineering journal, Springer, Berlin, DE, vol. 7, No. 5, May 1, 2006, pp. 668-676, ISSN: 1862-1775, DOI: 10.1631/JZUS.2006.A0668.

Lee et al., "Adaptive Spatial Resolution Control Scheme for Mobile Video Appiications", 2007 IEEE International Symposium on Signal Processing and Information Technology, Dec. 15, 2007, pp. 977-982.

SIPO Search Report for Corresponding Application CN2008801289670 Dated Oct. 23, 2012.

* cited by examiner

METHOD AND APPARATUS FOR POWER SAVINGS IN STAGGERCASTING

This application claims the benefit, under 35 U.S.C. §365 of International Application PCT/US2008/005,773, filed 2 May 2008, which was published in accordance with PCT Article 21(2) on 5 Nov. 2009 in English.

BACKGROUND

1. Technical Field

The present principles relate to the principle of redundant time-staggered content transmission to enhance robustness. This technique is termed "staggercasting". More particularly, they relate to a power savings method and apparatus for use in a staggercasting environment.

2. Description of the Related Art

Current digital television transmission standards in the United States, as proposed by the Advanced Television Systems Committee (ATSC) dated Sep. 16, 1995, use a single carrier modulation technique: eight level vestigial sideband modulation (8-VSB). Because The 8-VSB signal is susceptible to signal degradation in the communications channel, such as fading caused by multipath and other signal attenuation. While some such fading may be compensated by channel equalization techniques, if the fade is long enough and severe enough, then the receiver will lose the signal and the demodulator system will lose synchronization. Reacquiring the signal, and resynchronizing the demodulator can take several seconds and is quite objectionable to a viewer.

To overcome this problem, a first ATSC proposal permits creation of a second communications channel by permitting use of a more robust modulation technique for a limited period of time, e.g. less than 10%. For example, a 2 or 4-VSB modulation technique may be used for selected frames. A second ATSC proposal permits a more robust encoding technique, e.g. trellis encoding, while maintaining an 8-VSB modulation technique. Such a system permits improved performance with compatible receivers while maintaining backwards compatibility with existing receivers.

Another technique for overcoming fading is staggercasting [references from our earlier patent applications]. Staggercasting communications systems transmit a composite signal including two component content representative signals: one of which is offset in time with respect to the other. Put another way, one of the component content representative signals is advanced with respect to the other. The composite signal is broadcast to one or more receivers through a communications channel. At a receiver, the advanced-in-time component content representative signal is delayed through a delay buffer so that it becomes resynchronized in time with the other component content representative signal. Under normal conditions, the undelayed received component content representative signal is used to reproduce the content. If, however, a signal fade occurs, then the previously received and advanced-in-time content representative signal in the delay buffer is used to reproduce the content until either the fade ends and the composite signal is available again, or the delay buffer empties. If the delay period, and the associated delay buffer, is large enough then most probable fades may be compensated for. As such, it will be apparent that staggercasting allows the receiver to substitute or reconstruct lost portions of a main signal with a correctly received time-staggered supplemental signal.

Staggercasting improves robustness of reception of a terrestrially transmitted signal by overcoming fades. As mentioned above, the method calls for substituting or reconstructing faded (and hence lost) segments of a program from a time-advanced version of the program that was correctly received. However, in order to process and store both versions of the program (i.e., both the main/normal signal and the supplemental/staggercast signal), additional processing power and memory for storage is required.

Thus, it would be desirable to provide a power savings system that addresses this increased power requirement in a staggercasting scenario.

SUMMARY

The present principles proposes a control mechanism for power-savings (either user controlled or managed automatically by the application by sensing a power threshold) to determine whether or not both signals (i.e., normal and staggercast) or either of the signals get processed and delivered to the application for presentation to the end user.

According to an implementation, the receiver has a decoder configured to decode both a normal stream and a time-advanced stream and a power savings mode selector configured to receive a predetermined input and in response to the input, force the selection of the time-advanced stream for decoding and display. The decoder is configured to decode a lower resolution time-advanced signal.

An upconverter may be provided to upconvert the lower resolution time-advanced stream to match the resolution of a display device.

The receiver can further include a delay buffer to delay the time-advance stream, and a multiplexer configured to receive both the delayed and non-delayed version of the time-advanced stream.

According to another implementation, the method for power saving in a receiver includes identifying a power savings request at an input of a power savings mode selector, and selecting a time-advanced stream in response to the power savings request.

The method may further include upconverting the lower resolution staggercast stream to match the resolution for display on a display device.

During power savings mode, the fade protection is disabled in response to an identified power savings request, and the delay buffer on the time-advanced stream is bypassed such that the selected stream is not delayed.

The power saving request can be in the form of a user input at the power mode selector, or can be a detected low batter condition in the receiver.

Other aspects and features of the present principles will become apparent from the following detailed description considered in conjunction with the accompanying drawings. It is to be understood, however, that the drawings are designed solely for purposes of illustration and not as a definition of the limits of the present principles, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar components throughout the views.

DETAILED DESCRIPTION

Figure 1:
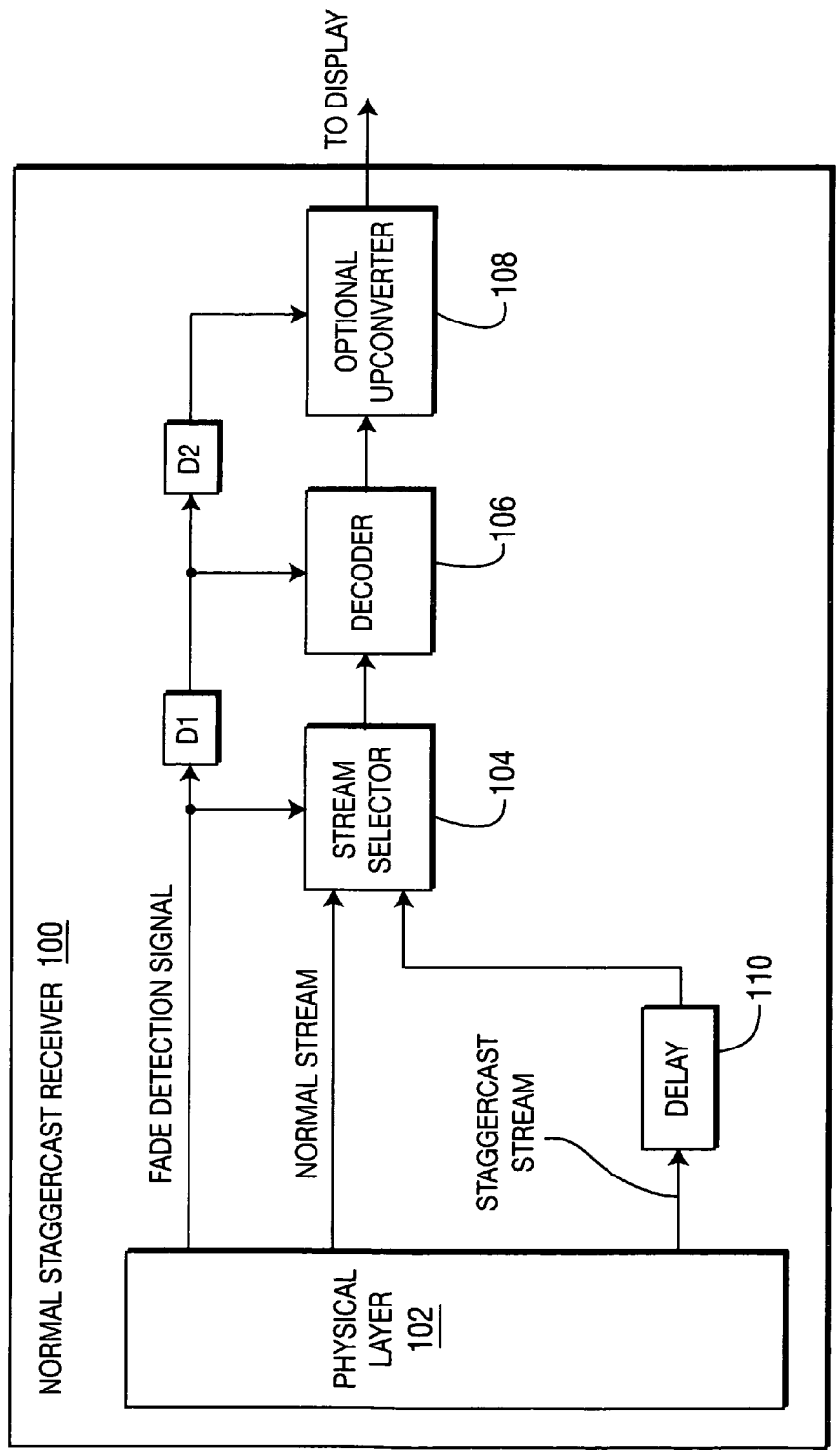
FIG. 1 is a block diagram of standard or normal staggercast receiver as is known in the prior art.

FIG. 1 shows a normal staggercast receiver 100 and the corresponding components generally found therein. The staggercast receiver includes a physical layer 102 that outputs the normal stream, the staggercast steam and the fade detection signals. A stream selector receives the normal stream and the delayed (110) staggercast stream. The decoder 106 decodes the selected stream and outputs the same to a display device. An optional upconverter 108 can be included which operates to upconvert the resolution of the decoded stream, depending on the application or selected resolution output dictated by a user or the display device. The fade detection signal (or delayed versions of the same—D1, D2) is input into each of the stream selector 104, decoder 106 and optional upconverter 108.

In this exemplary normal staggercasting mode, the receiver 100 operates on the principle of receiving both the normal and "staggercast" streams. In the event of a fade in the normal stream, the receiver substitutes the content with the already received staggercast stream (via the stream selector). The staggercast stream may be of the same resolution or of a different resolution than the normal stream. In the case when the staggercast stream is of a lower resolution, the optional upconversion (108) needs to be applied to the staggercast stream in order to display it as a substitution for the normal stream.

Figure 2:
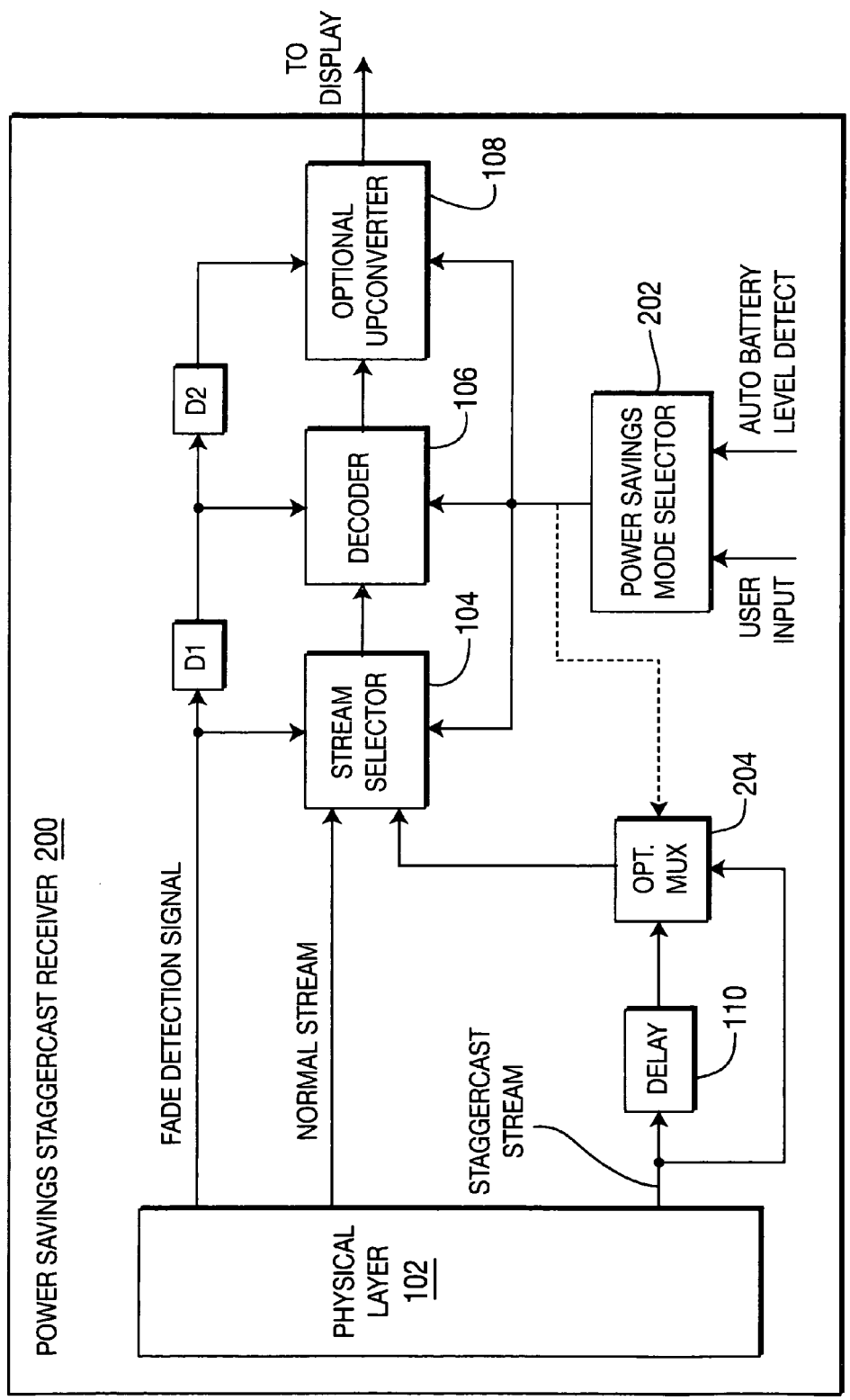
FIG. 2 is a block diagram of a power saving staggercast receiver according to an implementation of the present principles.

FIG. 2 shows a power savings staggercast receiver 200 according to an exemplary implementation of the present principles. In this mode (i.e., power savings mode), the staggercast stream is selected for decoding and display. The power savings mode can be based on either a user input or an auto battery level detect through the added power savings mode selector 202. By processing the lower resolution staggercast stream, this saves battery power since it is more power efficient to decode the lower resolution stream, as compared to the normal stream. The trade off made here is the lower quality of the staggercast stream in return for saved power.

According to one implementation, the use of the power savings mode selector 202, overrides the fade detection signal, and the staggercast stream is selected over the normal stream for decoding and optional upconversion. It is understood that in this power savings mode, the quality of the output display will be weaker due to the lack of fade protection, as well as the lower resolution signal being upconverted. However, in a low battery situation, this may be acceptable since it consumes less power for the decoding process.

According to another implementation, to increase power savings, the power savings mode may also bypass the delay buffer 110 in the staggercast path by incorporating an optional multiplexer 204 which operates to select the non-delayed staggercast stream signal. Another application of this feature would be to allow the user to bypass the delay (110) in the staggercast path and watch the program earlier (e.g., by a second or two depending on the staggercast delay). This may be particularly important when viewing sports programming.

Figure 3:
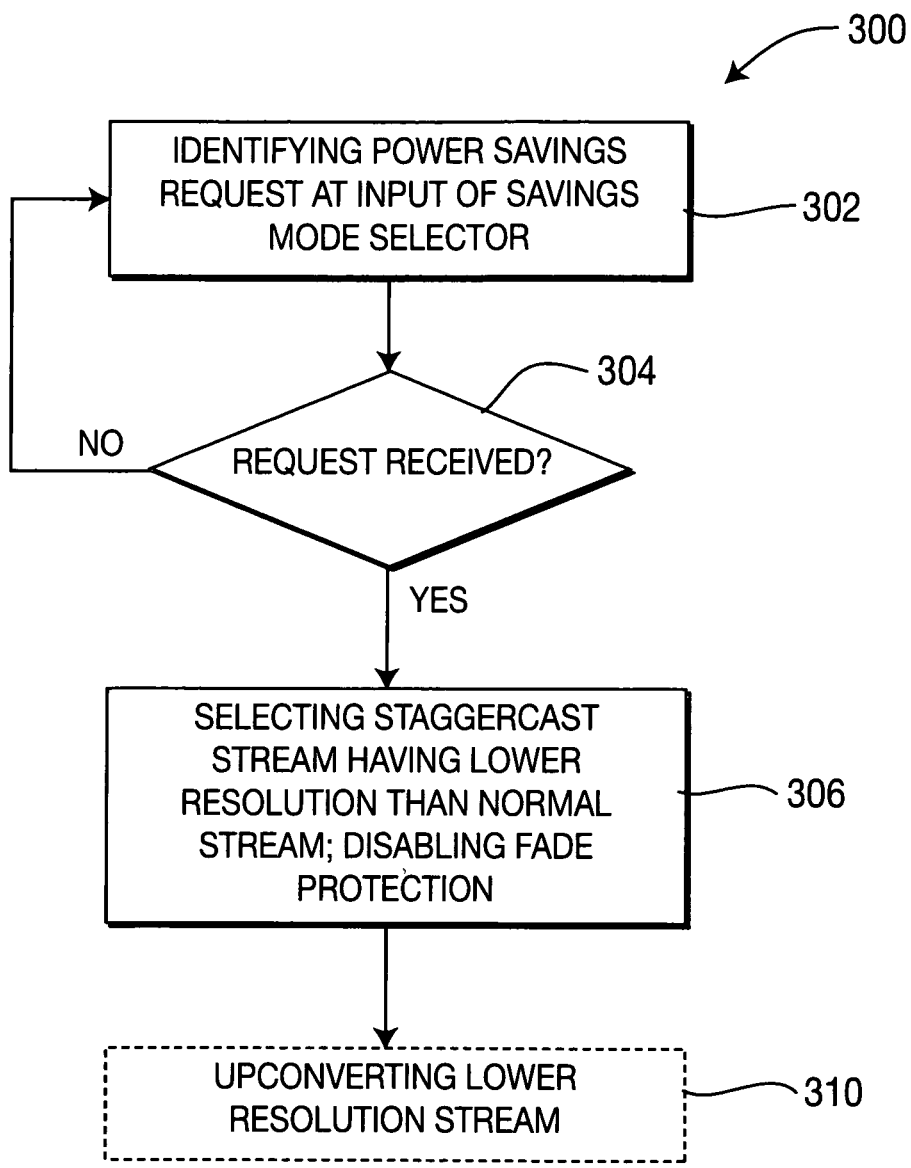
FIG. 3 is a flow diagram of the power saving method according to an implementation of the present principles.

FIG. 3 shows the method 300 according to an implementation of the present principles. Initially, a power savings request is identified (302) at an input of the power savings mode selector (202). If the request is received (304), the staggercast stream is selected, and the fade protection is disabled (306). As mentioned above, optionally the upconversion (310) of the lower resolution staggercast stream can be performed prior to delivery to the display device.

It is to be understood that the present principles may be implemented in various forms of hardware, software, firmware, special purpose processors, or a combination thereof. Preferably, the present principles may be implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present principles is programmed. Given the teachings herein, one of ordinary skill in the related art will be able to contemplate these and similar implementations or configurations of the present principles.

While there have been shown, described and pointed out fundamental novel features of the present principles, it will be understood that various omissions, substitutions and changes in the form and details of the methods described and devices illustrated, and in their operation, may be made by those skilled in the art without departing from the spirit of the same. For example, it is expressly intended that all combinations of those elements and/or method steps which perform substantially the same function in substantially the same way to achieve the same results are within the scope of the present principles. Moreover, it should be recognized that structures and/or elements and/or method steps shown and/or described in connection with any disclosed form or implementation of the present principles may be incorporated in any other disclosed, described or suggested form or implementation as a general matter of design choice. It is the intention, therefore, to be limited only as indicated by the scope of the claims appended hereto.

The invention claimed is:

1. An apparatus comprising:
   a decoder configured to decode both a normal stream, wherein said normal stream comprises an image of a television program content having a first resolution, and a time-advanced stream, wherein said time-advanced stream comprises said image of said television program content having a second resolution and being transmitted time-advanced with respect to said image having said first resolution, said second resolution being lower than said first resolution;
   a delay buffer configured to delay said time-advanced stream;
   a multiplexer having first and second inputs, said first input receiving a non-delayed version of said time-advanced stream and said second input coupled to an output of said delay buffer and receiving said delayed version of said time-advanced stream, said multiplexer being configured to forward a selected input towards said decoder; and a power savings mode selector configured to receive an input signal indicating a power saving mode, and in response to said input signal operative to force only said time-advanced stream to be selected for decoding and display while forcing said delay buffer to be bypassed such that said delaying operation for said time-advanced stream is disabled and said non-delayed version of said time-advanced stream is selected by said multiplexer.

2. The apparatus of claim 1, further comprising an upconverter configured to upconvert said lower resolution time-advanced stream in response to said input signal.

3. The apparatus of claim 1, wherein said input signal is provided in response to a user input.

4. The apparatus of claim 1, wherein said apparatus is configured to detect a low battery power condition, and wherein said input signal is provided in response to said detection of said low battery condition.

5. A method comprising the steps of:
receiving a first stream, wherein said first stream comprises an image of a television program content having a first resolution;
receiving a time-advanced stream, wherein said time-advanced stream comprises said image of said television program content having a second resolution, and being transmitted time-advanced with respect to said image having said first resolution, said second resolution being lower than said first resolution;
decoding both said first and time-advanced streams in a normal mode of operation and decoding only said time-advance stream in a power saving mode of operation;
buffering said time-advanced stream for providing a delayed version of said time-advanced stream;
multiplexing a non-delayed version of said time-advanced stream and said delayed version of said time-advanced stream, and forwarding a stelected version of said time-advanced stream for said decoding; and
forcing to select only said time-advanced stream for decoding and display in response to an input signal indicating said power saving mode while forcing to bypass said buffering step such that said delaying operation of said time advance stream is disabled and said non-delayed version of said time-advance stream is selected in said multiplexing process.

6. The method of claim 5, wherein said input signal is provided in response to a user input.

7. The method of claim 5, further comprising the step of detecting a low battery condition and providing said input signal in response to said detection of said low battery condition.

* * * * *